(No Model.)
B. F. WESTMORELAND & R. H. BABINGTON.
VEHICLE AXLE SLEEVE.
No. 588,759. Patented Aug. 24, 1897.
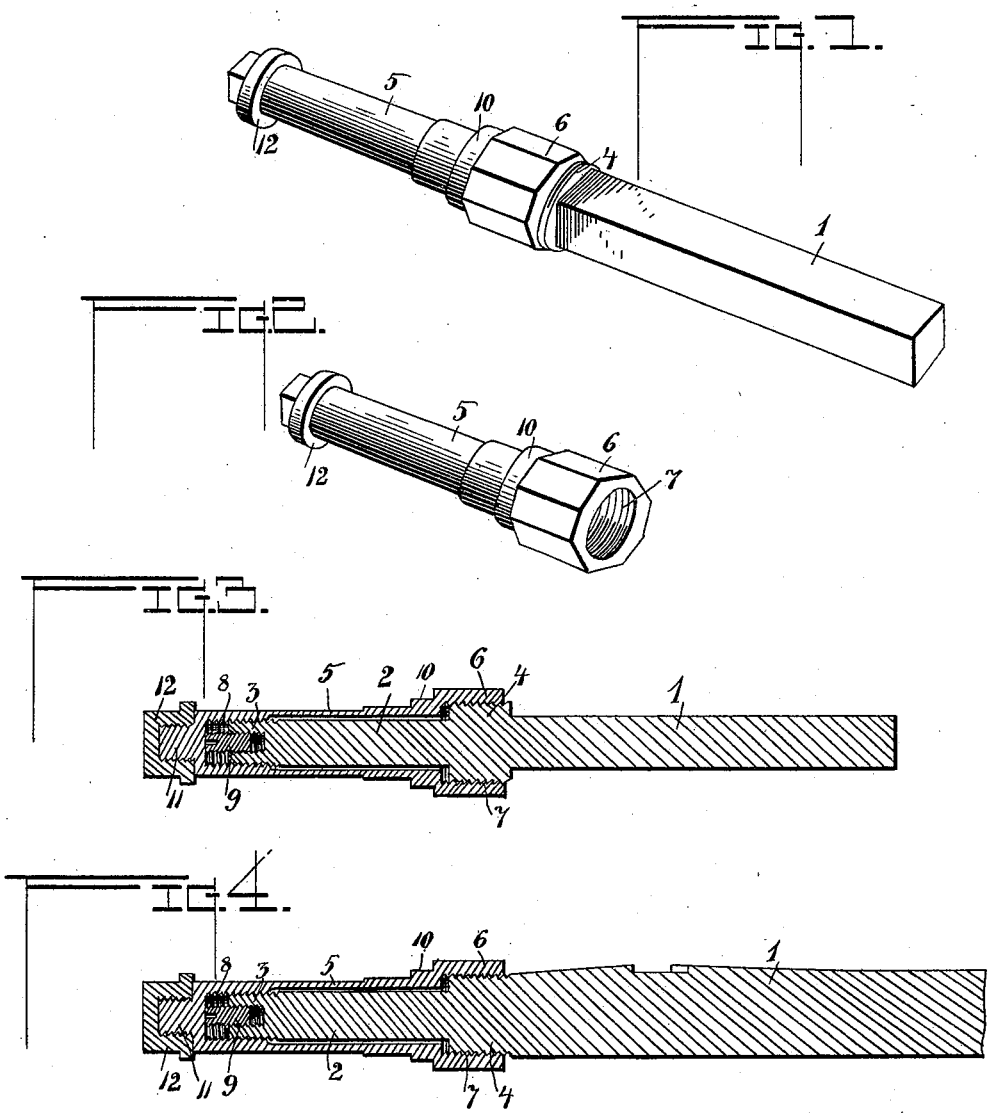
Witnesses
O. Seiffert
J. A. Willson
Inventors
B. F. Westmoreland,
R. H. Babington
by H. B. Willson
Attorney

UNITED STATES PATENT OFFICE.

BENJIMAN F. WESTMORELAND AND ROBERT H. BABINGTON, OF FRANKLINTON, LOUISIANA.

VEHICLE-AXLE SLEEVE.

SPECIFICATION forming part of Letters Patent No. 588,759, dated August 24, 1897.

Application filed April 9, 1897. Serial No. 631,436. (No model.)

*To all whom it may concern:*

Be it known that we, BENJIMAN F. WESTMORELAND and ROBERT H. BABINGTON, citizens of the United States, residing at Franklinton, in the parish of Washington and State of Louisiana, have invented certain new and useful Improvements in Vehicle-Axle Sleeves; and we do declare the following to be a full, clear, and exact description of the invention, such as will enable others skilled in the art to which it appertains to make and use the same.

Our invention has relation to improvements in vehicle-axles, and more particularly to that class provided with a detachable thimble or skein; and the object is to provide a simple and convenient device of this kind.

To this end the novelty consists in the construction, combination, and arrangement of the same, as will be hereinafter more fully described, and particularly pointed out in the claims.

In the accompanying drawings the same reference-characters indicate the same parts of the invention.

Figure 1 is a perspective view of our improved axle with the skein in place. Fig. 2 is a similar view showing the skein withdrawn from the axle. Fig. 3 is a longitudinal section of the axle with the skein or thimble in place. Fig. 4 is a modification showing the invention applied to a wooden axle.

1 represents the axle proper, and 2 the cylindrical shank, the outer end 3 of which is threaded for a short distance, as shown.

4 represents a threaded collar cylindrical in form and having the same pitch of thread as the outer end 3 of the shank.

5 represents the detachable skein or thimble, and its enlarged end terminates in an integral polygonal sleeve 6, having an internal threaded portion 7, which engages the threaded collar 4 on the axle.

8 represents a threaded socket formed in the inner end of the skein to receive the threaded end 3 of the axle, and when the skein is adjusted to the axle the end of the socket comes in contact with the end of the screw-stud 9, which limits the distance to which the sleeve can be placed on the axle. Consequently a slight change in the position of the stud 9 will change the position of the skein on the axle, and consequently present a new wearing-surface for the hub-box.

10 represents a reinforcing-collar on the skein to stiffen and strengthen it, and 11 represents the usual threaded stud for the reception of the nut 12.

Although we have specifically described the construction and relative arrangement of the several elements of our invention, we do not desire to be confined to the same, as such changes or modifications may be made as clearly fall within the scope of our invention without departing from the spirit thereof.

Having thus fully described our invention, what we claim as new, and desire to secure by Letters Patent of the United States, is—

1. The axle 1, having the cylindrical shank 2, threaded end 3, and the correspondingly-threaded collar 4, in combination with the detachable skein or thimble 5, formed with the internally-threaded polygonal sleeve 6, reinforced collar 10, and the threaded socket 8, substantially as shown and described.

2. The axle 1, having the cylindrical shank 2, threaded end 3, and correspondingly-threaded collar 4, in combination with the screw-stud 9, adjustably secured in the end of said axle, and the detachable skein or thimble 5, provided with the internally-threaded polygonal sleeve 6, reinforced collar 10, and the threaded socket 8, substantially as shown and described.

In testimony whereof we hereunto affix our signatures in presence of two witnesses.

BENJIMAN F. WESTMORELAND.
ROBERT H. BABINGTON.

Witnesses:
W. J. JONES,
C. E. BICKHAM.